United States Patent Office 3,423,929
Patented Jan. 28, 1969

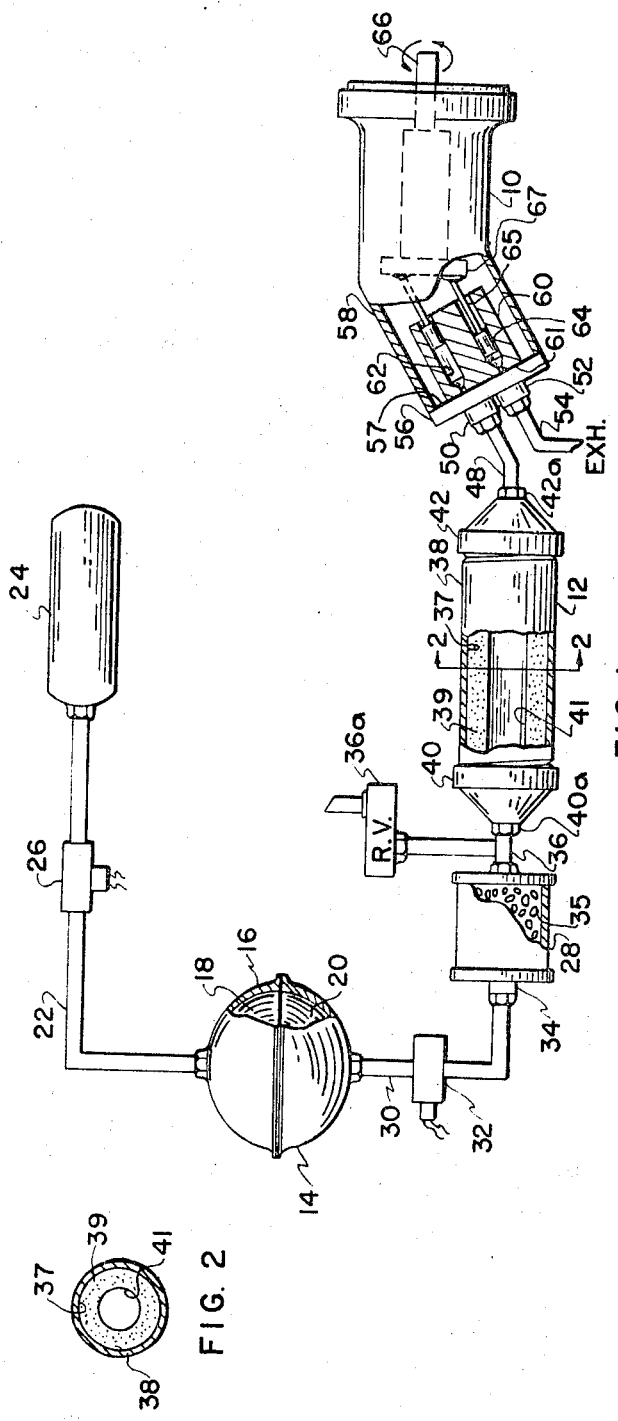

3,423,929
POWER TRANSMISSION HOT GAS ENGINE
WITH ABLATIVE LUBRICANT MEANS
Hugh B. Matthews, Birmingham, Mich., assignor to Sperry Rand Corporation, Troy, Mich., a corporation of Delaware
Filed June 28, 1967, Ser. No. 649,691
U.S. Cl. 60—39.02     16 Claims
Int. Cl. F02c 7/06; F01m 9/12; C10m 9/00

ABSTRACT OF THE DISCLOSURE

A power supply system having a source of hot gas for driving a fluid motor, the output shaft of which is adaptable for operating a load device. Interposed in the hot gas flow stream between the hot gas source and the motor is a hot gas lubricator comprising an ablative lubricant for lubricating the motor during operation.

Background of the invention

This invention pertains to power transmissions, and is particularly applicable to power supply systems wherein a high temperature gaseous fluid, commonly referred to as hot gas, is employed as the motive fluid for driving a pressure energy translating device such as a fluid motor. Such systems are particularly applicable for operating components of missiles and rockets, and other similar applications. Specifically, this invention relates to entraining a lubricant in the hot gas for purposes of lubricating the internal relatively movable metal parts of the fluid motor during operation.

The use of high temperature hot gas as an efficient and compact source of power has received increased acceptance and recognition in recent years in power supply and control systems for space applications. However, due to the errosive and corrosive effect of the hot gas on metal and its inherent lack of lubricity, the use of hot gas with devices having relatively movable metal parts has been limited to applications of relatively short operational life requirements. One such application is in a power supply system in which hot gas is used as the motive fluid for driving a rotary fluid motor.

The type of motor most commonly used in the past has been of the axial piston type well-known in the art. Due to the lack of lubricity of the hot gas, excessive wear between the cylinder bore and piston results after a short time of operation, substantially reducing the efficiency of the motor and in many instances the pistons become seized in the bore causing complete failure of the motor. Efforts to extend the operational life of the motor, such as the use of exotic materials and surface treatments, though moderately successful, have not achieved the desired extension in operational life. The cost of such materials and use of such surface treatments is extremely expensive and thus, greatly increases the cost of the motor.

Patent No. 3,261,426, issued to W. F. Kuhlman on July 19, 1966, discloses a method of entraining a lubricant in air which is used for driving an air type motor. The patent discloses an oil saturated wick, one end of which protrudes into the air flow stream, while the other end is submerged in a pressurized oil reservoir. While this arrangement is satisfactory for application of air at substantially atmospheric temperatures, such arrangements obviously would not be satisfactory for hot gas applications due to the possible flammable characteristics of the oil and wick.

Summary

This invention basically relates to the lubrication of a hot gas driven fluid motor during operation. Specifically, this invention pertains to the use of an ablative material upstream of the motor inlet port. This material comprises minute lubricating particles which will ablate when exposed to high temperature hot gas. The ablated particles become entrained in the hot gas and are carried by the hot gas to the motor where they are deposited on the metal surfaces of the motor exposed to the hot gas to lubricate the same during operation.

An object of this invention is to substantially extend the operational life of a fluid motor driven by a high temperature hot gas by lubricating the motor during operation.

Another object of this invention is to entrain a lubricant in the hot gas prior to its entering the motor.

Another object of this invention is to entrain the combination of a lubricant and a surface reactant to lubricate and surface treat the internal metal parts of the motor exposed to the hot gas.

A further object of this invention is to reduce the manufacturing cost of the motor by eliminating expensive material combinations and surface treatments.

Further objects and advantages of the present invention will be apparent from the following description, reference being made to the accompanying drawings wherein a preferred form of the present invention is clearly shown.

In the drawings

FIG. 1 is a part sectional, partly diagrammatic view of a power supply system employing the present invention.

FIG. 2 is a sectional view along line 2 in FIG. 1.

FIGS. 4 and 6 are sectional views along lines 4 and 6 in FIGS. 3 and 5 respectively.

FIGS. 3 and 5 are partly sectional views of additional embodiments of the invention.

Referring to FIG. 1, the embodiment of the invention selected for illustration comprises a pressure energy translating device such as an axial piston type motor 10, well known in the art, a hot gas lubricator 12, and a liquid monopropellant high temperature hot gas power source, generally designated by the number 14. The power source 14 comprises a reservoir 16 having a diaphragm dividing the reservoir into two sealed chambers 18 and 20. The upper chamber 18 is connected by a conduit 22 to a pressure supply tank 24 which is filled with a suitable gas such as nitrogen, for pressurizing the reservoir 16. A pressure control valve 26 is provided in conduit 22 for controlling the gas pressure in chamber 18. The lower chamber 20 is filled with a liquid monopropellant such as hydrazine ($N_2H_4$). Chamber 20 is connected to a reaction chamber 28 by conduit 30, having an on-off valve 32 connected therein to control the flow of the monopropellant to the reaction chamber 28. A nozzle 34 is located at the entrance to the reaction chamber 28 for throttling the liquid monopropellant onto a catalyst 35 contained within the chamber 28, and which is used to decompose the monopropellant to produce the pressurized hot gas. The reaction chamber 28 is connected to the hot gas lubricator 12 by conduit 36 to which is connected a pressure relief valve 36a.

The hot gas lubricator 12 comprises a cylindrical tube 38 having a longitudinal passage 37 therethrough. An inlet cap 40 and an outlet cap 42 are threaded on each end of the tube 38. Inlet cap 40 has an inlet port 40a connected to conduit 36 and outlet cap 42 has an outlet port 42a. Each of these ports communicate with the interior of tube 38. An ablative material 39 in the form of a cylinder having an outside diameter closely fitted to the bore 37 and having a longitudinal passage 41 therethrough, is contained within the tube 38. An ablative material is of a nature which, when exposed to high temperature, gradually erodes away. The process of erosion is referred to as ablation. Ablative materials are used extensively in space applications, such as, on nose cones of re-entry vehicles for the purpose of cooling. The latent heat of vaporization of ablative materials used in nose cone applications is such that as the material ablates, a cooling effect is produced. In the instant invention, the ablative material is used not for the purpose of cooling, but to employ the ablated material which has eroded away from the main mass and which becomes entrained in the hot gas for purposes of lubricating the motor 10. The ablative material 39 comprises an aggregation of minute lubricating particles bonded together by a bonding agent. The composition of the ablative material 39 may be cast or compressed into the desired shape. For example, the cylindrical shape shown in FIG. 1 or as in FIG. 3 wherein the ablative material is in the form of a series of discs 39a longitudinally spaced within bore 37. Each disc 39a has a plurality of axial passages 44 as shown in FIG. 4. FIG. 5 shows a configuration wherein the ablative material is laminated on a screen 46 which is loosely rolled in a spiral manner to form a cylinder fitted in the bore 37. The size and shape of the ablative material depends upon several factors, such as, the time duration of operation, and the amount of lubricant required to satisfactorily lubricate the device being driven by the hot gas. Basically, the amount of lubricant which will be entrained in the hot gas is proportional to the surface area of the ablative material exposed to the hot gas flow stream. The lubricant may be graphite or a graphite compound and the bonding agent preferably a composition which when exposed to high temperature will change from a solid state to a substantially gaseous state. Sulfur or a sulfur compound is a desirable bonding agent in that it will also react with ferrous base metals to provide an improved wear resistant surface. Compositions of from 10% to 50% by weight of graphite with the balance sulfur has been found to be an excellent combination for an ablative lubricant.

Motor 10 comprises a valve plate 56 attached to a housing 58 by suitable means not shown. Valve block 56 has an inlet port 50 and an outlet port 52 open to the atmosphere through a conduit 54. The outlet port 42a of the hot gas lubricator 12 is connected to a conduit 48 which is connected to the motor inlet port 50. Motor 10 includes a cylinder block 60 rotatably mounted in the end of housing 58 adjacent the valve plate 56 such that the cylinder block face 61 is juxtaposed against the valve plate face 57. Block 60 includes a plurality of circumferentially spaced axially extending cylinders 62 in which pistons 64 are mounted for reciprocating movement. Pistons 64 carry rods 65 which are connected to a flange 67 by ball joints 67a. Flange 67 is connected to drive shaft 66 which extends externally of housing 58 and which is adaptable for driving a load device, not shown.

An alternate form of a power source, such as a solid propellant hot gas generator, may be used in place of the liquid monopropellant power source 14 and which would be connected directly to the hot gas lubricator 12.

The power source, whether of the liquid monopropellant type as shown in FIG. 1, or of the solid bipropellant type produces a hot gas which when used without the lubricator 12 is extremely detrimental to the metal parts of the motor and limits the operational life of the motor 10. However, the liquid monopropellant power source is even more injurious to the motor than the solid bi-propellant power source. This is due to the chemical composition of the two propellants and their products of combustion.

In operation, referring to FIG. 1, the liquid monopropellant in chamber 20 is first pressurized to a predetermined supercharge pressure, by pressurizing chamber 18. The magnitude of the supercharge pressure is controlled by valve 26 which, in turn, controls the flow of nitrogen from tank 24 to chamber 18. A pressure feedback between chamber 18 and valve 26, not shown, may be employed to maintain a constant supercharge pressure. When the liquid monopropellant has been properly pressurized, on-off valve 32 is opened allowing the liquid monopropellant to flow from chamber 20 through conduit 30 to nozzle 34. The liquid monopropellant is vaporized as it flows through the nozzle 34 into the reaction chamber 28. The catalyst 35 within the reaction chamber 28 decomposes the propellant resulting in the production of a high temperature hot gas. The temperature of this gas ranges in magnitude from 1100 to 2000° F., depending upon the quantity of dilutents, such as water, mixed with the monopropellant. The high temperature hot gas passes from the reaction chamber 28 through conduit 36 into the hot gas lubricator 12. Relief valve 36a serves to prevent excessive hot gas pressures beyond a predetermined valve which may be in the order of 2000 p.s.i.

As the hot gas flows into the hot gas lubricator 12, the heat of the hot gas melts the bonding agent on the surface of the ablative material in contact with the hot gas, allowing the minute lubricating particles to be dispersed in the hot gas. As the hot gas flows through the lubricator 12, through conduit 48 and into the motor 10, the minute lubricating particles entrained in the hot gas are deposited on the metal surfaces of the motor exposed to the hot gas. The lubricating particles so deposited form a lubricating film between the surfaces of the cylinders 62 and the pistons 64. Also, a lubricating film is established between the faces of the valve plate 56 and the cylinder block 60 as the hot gas leaks across this face to the interior of the motor housing.

As the hot gas continues flowing through the lubricator 12, the ablative material 39 continues to ablate, in substantially a uniform manner, in that the diameter of the ablative lubricant uniformly increases. Similarly, referring to FIG. 3, the holes 44 in the discs 39a uniformly increase in diameter until the discs are totally ablated. Also, referring to FIG. 5, a similar result occurs, in that the ablative lubricant laminated on the screen ablates gradually as the hot gas flows through the screen 46.

When a surface reactant is used as the bonding agent an additional benefit is achieved, in that the wear resistant characteristics of the metal surfaces are greatly enhanced. When sulfur is used as the bonding agent, the sulfur reacts with the ferrous base metal surfaces exposed to the hot gas forming a ferrous sulfide, which provides an excellent wear resistance surface. Thus when these surfaces are lubricated, the operational life of the system and specifically, the motor, is further extended.

It should now be apparent that the invention disclosed and described herein will substantially increase the operational life of a fluid motor when driven by a high temperature hot gas. It should be further apparent that this invention discloses a unique arrangement for lubricating the metal parts of the motor during operation and in addition for surface treating the metal parts of the motor during operation to provide an improved wear resistant surface.

What is claimed is as follows:

1. In a power supply system comprising: a fluid motor having inlet and exhaust ports and having therein relatively movable metal parts; a source of hot gas; passage means communicating said source with said motor inlet port through which said hot gas flows to said motor; and, ablative means positioned in said passage means for lubricating said metal parts of said motor during operation.

2. In a power supply system comprising: a fluid motor having inlet and exhaust ports and having therein relatively movable metal parts; a source of hot gas; passage means communicating said source with said motor inlet port, through which said hot gas flows to said motor; and, an ablative material positioned in said passage means having a surface exposed to said hot gas; said material comprising a lubricant whereby said material will ablate with said lubricant becoming entrained in said hot gas and carried thereby to said motor to lubricate said metal parts of the motor during operation.

3. The combination as defined in claim 2 wherein said ablative material comprises minute lubricating particles and a bonding agent to bond said particles together, said bonding agent having a melting point lower than said hot gas.

4. The combination as defined in claim 3 wherein said ablative material comprises carbon in the form of graphite.

5. The combination as defined in claim 3 wherein said metal parts are steel and said bonding agent comprises a surface reactant means which when melted becomes entrained in said hot gas and reacts with the surface of the metal parts of said motor exposed to said hot gas to provide an improved wear resistant surface.

6. The combination as defined in claim 5 wherein said bonding agent comprises a sulfur base compound which reacts with the iron content of said steel parts to produce a sulfurized surface.

7. In a power supply system comprising: a rotary fluid pressure energy translating device, said device being of the type having a drive member, a rotary cylinder block having a plurality of axially positioned cylinders, pistons reciprocable in said cylinders and motion converting means for converting the reciprocating motion of said pistons to a rotary motion of said drive member, said device having an inlet and an exhaust port successively communicating with each of said cylinders; a source of pressurized hot gas; passage means communicating said source with said inlet port, and; an ablative material arranged in said passage in the flow stream of said hot gas such that a surface of said material is exposed to said hot gas, said ablative material comprising a lubricant whereby said material will ablate when exposed to said hot gas with said lubricant becoming entrained in said hot gas and carried thereby to said motor to lubricate the surfaces between said cylinders and said pistons during the operation of the motor.

8. The combination as defined in claim 7 wherein said source of hot gas comprises a pressurized liquid monopropellant which when decomposed produces said hot gas.

9. The combination as defined in claim 8 wherein said monopropellant is liquid hydrazine ($H_2NNH_2$).

10. The combination as defined in claim 7 wherein said source of hot gas comprises a solid bipropellant which when burned produces said hot gas.

11. The combination as defined in claim 7 wherein said ablative material comprises minute lubricating particles and a bonding agent to bond said particles together, said bonding agent having a melting point lower than said hot gas, such that the bonding agent directly exposed to said hot gas melts freeing said lubricating particles bonded thereby which become entrained in said hot gas.

12. The combination as defined in claim 11 wherein said ablative material comprises carbon in the form of graphite.

13. The combination as defined in claim 11 wherein said metal parts are steel and said bonding agent comprises a surface reactant means which when melted becomes entrained in said hot gas and reacts with the surface of the metal parts of said motor exposed to said hot gas to provide an improved wear resistant surface.

14. The combination as defined in claim 13 wherein said bonding agent comprises a sulfur base compound which reacts with the iron content of said steel parts to produce a sulfurized surface.

15. A hot gas lubricator comprising: an inlet cap having an axial inlet passage therethrough; an outlet cap having an axial outlet passage therethrough; said caps being axially spaced apart; a tube having a longitudinal passage therethrough, said tube being interposed between and connected to said caps; said longitudinal passage being in communication with said axial passages in said inlet and outlet caps; an ablative material positioned in said longitudinal passage and having an exposed surface, means for flowing a hot gas from the inlet passage to the outlet passage and over said exposed surface; said material comprising minute lubricating particles which when said material ablates said particles become entrained in said hot gas and carried thereby as the hot gas flows out the outlet passage.

16. A method for lubricating the internal parts of a fluid motor during operation when driven by high temperature hot gas comprising: supplying pressurized hot gas to the motor; interposing a solid ablative lubricant in the hot gas stream prior to the entrance of the hot gas into the motor; ablating the solid lubricant into minute particles; entraining the minute lubricating particles in the hot gas, and; depositing the lubricating particles on the internal parts of the motor exposed to the hot gas.

References Cited

UNITED STATES PATENTS

| | | | |
|---|---|---|---|
| 908,920 | 1/1909 | Whitcomb | 92—154 XR |
| 1,324,327 | 12/1919 | Turner | 92—154 |
| 2,570,363 | 10/1951 | Mercier | 184—55 XR |
| 2,642,722 | 6/1953 | Vaughn | 92—154 XR |
| 2,999,358 | 9/1961 | Zwick | 60—39.46 |
| 3,059,429 | 10/1962 | Bjerklie et al. | 60—39.46 |
| 3,349,562 | 10/1967 | Williams et al. | 60—251 |

CARLTON R. CROYLE, *Primary Examiner.*

U.S. Cl. X.R.

60—39.08, 39.47, 39.46; 184—1, 55; 252—15, 30; 92—154